US012682211B2

(12) United States Patent
Liang et al.

(10) Patent No.: US 12,682,211 B2
(45) Date of Patent: Jul. 14, 2026

(54) OPTIMIZING KEY VALUE CACHE FOR LARGE LANGUAGE MODEL INFERENCE

(71) Applicant: Character Technologies Inc., Palo Alto, CA (US)

(72) Inventors: Bowen Liang, Sunnyvale, CA (US); Noam Mordechai Shazeer, Palo Alto, CA (US); Myle Ott, New York, NY (US)

(73) Assignee: Character Technologies Inc., Palo Alto, CA (US)

( * ) Notice: Subject to any disclaimer, the term of this patent is extended or adjusted under 35 U.S.C. 154(b) by 0 days.

(21) Appl. No.: 19/191,984

(22) Filed: Apr. 28, 2025

(65) Prior Publication Data

US 2025/0390703 A1 Dec. 25, 2025

Related U.S. Application Data

(60) Provisional application No. 63/661,848, filed on Jun. 19, 2024.

(51) Int. Cl.
*G06N 3/043* (2023.01)
(52) U.S. Cl.
CPC ................................... *G06N 3/043* (2023.01)
(58) Field of Classification Search
CPC .......... G06N 3/045; G06N 3/08; G06N 3/084; G06N 3/0455; G06N 3/048; G06N 3/047; G06N 3/044; G06N 3/0464; G06N 3/0499; G06N 3/04; G06N 20/00; G06N 3/098; G06N 3/0442; G06N 3/0475; G06N 3/082; G06N 3/0895; G06N 3/096; G06N 3/0495; G06N 3/063; G06N 3/088; G06N 3/09; G06N 7/01; G06N 7/06
See application file for complete search history.

(56) References Cited

U.S. PATENT DOCUMENTS

| | | | | |
|---|---|---|---|---|
| 2022/0044114 A1* | 2/2022 | Sriram | .................... | G06N 3/045 |
| 2023/0244452 A1* | 8/2023 | Li | .......................... | G06N 3/088 |
| | | | | 717/106 |
| 2024/0386256 A1* | 11/2024 | Thorp | .................... | G06N 3/084 |
| 2024/0386267 A1* | 11/2024 | Chen | ...................... | G06N 3/045 |

FOREIGN PATENT DOCUMENTS

| | | | | |
|---|---|---|---|---|
| WO | WO-2025119502 A1 * | 6/2025 | ............. | G06N 3/088 |

OTHER PUBLICATIONS

Beltagy et al., Longformer: The Long-Document Transformer, Dec. 2, 2020.
Brandon et al., Reducing Transformer Key-Value Cache Size with Cross-Lay Attention, May 21, 2024.
Noam Shazeer, Fast Transformer Decoding: One Write-Head is All You Need, Nov. 6, 2019.
Zheng et al., SGLang: Efficient Execution of Structured Language Model Programs, Jun. 6, 2024.

* cited by examiner

*Primary Examiner* — Luis A Sitiriche
(74) *Attorney, Agent, or Firm* — Van Pelt, Yi & James LLP

(57) ABSTRACT

An input sequence is received from a client device. Large language model inference is performed by processing the input sequence through a series of transformer layers to generate one or more tokens including by performing hybrid attention, multi-query attention, and cross-layer key value sharing. The one or more generated tokens are provided to the client device.

20 Claims, 3 Drawing Sheets

100

200

Receive An Input Sequence — 202

Tokenize The Input Sequence — 204

Convert Tokens Into Embeddings — 206

Pass The Embeddings Into The Transformer layers — 208

Predict The Next Token — 210

Select Or Sample The Next Token — 212

End Condition? — 214

No

Yes

Provide Response — 216

OPTIMIZING KEY VALUE CACHE FOR LARGE LANGUAGE MODEL INFERENCE

CROSS REFERENCE TO OTHER APPLICATIONS

This application claims priority to U.S. Provisional Patent Application No. 63/661,848 entitled OPTIMIZING ARTIFICIAL INTELLIGENCE INFERENCE filed Jun. 19, 2024 which is incorporated herein by reference for all purposes.

BACKGROUND OF THE INVENTION

Large language model (LLM) inference is the process where a pre-trained LLM generates outputs based on new input data. The pre-trained LLM "infers" or predicts the next words, sentences, or other forms of content using the knowledge it learned during its training phase. When generating text one token at a time, the LLM maintains a cache of all the previously computed keys and values. However, the cache becomes a bottleneck when memory usage scales with sequence length. As a result, latency increases as more tokens are cached and throughput drops as fewer parallel requests fit in memory.

BRIEF DESCRIPTION OF THE DRAWINGS

Various embodiments of the invention are disclosed in the following detailed description and the accompanying drawings.

DETAILED DESCRIPTION

Figure 1:
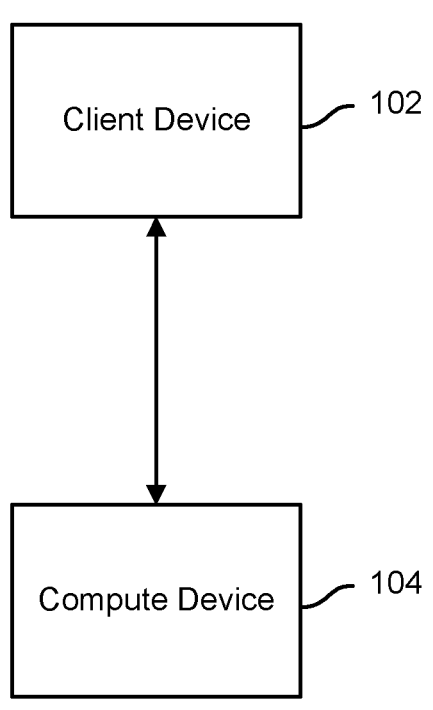
FIG. 1 is a block diagram illustrating a system to perform LLM inference in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Systems and methods to reduce key value cache size without degrading quality are disclosed herein. An input sequence comprised of a plurality of words is received. The plurality of words is tokenized. These tokens are converted to token identifiers (integers). Each token is converted into a corresponding embedding. The LLM has an embedding matrix where each token identifier indexes into the embedding matrix. An embedding for a token is obtained based on the token identifier. A positional embedding may be added to a token's embedding to tell the LLM where the token is in the sequence.

The embeddings are passed into a first transformer layer and utilized to compute a corresponding query vector for each token, a corresponding key vector for each token, and a corresponding value vector for each token, through learned linear projections. The query vector associated with a token represents what the current token is looking for—it's used to ask questions about the context. The key vector associated with a token represents how other tokens describe themselves—it's used to answer a query's question. The value vector associated with a token holds the actual information a token contributes—this information is passed along if the token is attended to.

Attention is a process where the LLM focuses on the most relevant parts of the input sequence when processing each token. Multi-head attention is the process where the LLM runs multiple attention mechanisms in parallel, each called a head, and the combines their results. Each head learns to focus on different parts of the sentence (e.g., coreference, subject-verb, prepositional phrase, etc.), allowing the model to capture different types of relationships between words. Each head gets its own set of learned weights for Q, K, and V. The model computes attention separately for each head. For n attention heads, this provides n different output vectors for each token. The model concatenates these outputs into one long vector. This vector is passed through a final linear layer to mix everything together.

The systems and methods disclosed herein utilize the query, key, and value vectors associated with each token to implement multi-query attention. Multi-query attention consists of multiple attention layers (heads) in parallel with different linear transformations on the queries, keys, values and outputs. Multi-query attention is similar to multi-head attention, except that all heads share the key vectors and the value vectors associated with the tokens. This significantly reduces the KV cache size compared to multi-head attention because it stores only one set of key and value vectors, instead of one set per head. As a result, LLM inference is faster, especially for long sequences.

For each token's query vector, the LLM computes a dot product between the query vector and the key vector of every other token (including itself) to obtain raw attention scores—numbers that reflect how much the current token should "pay attention" to the others. The attention scores are scaled by $\sqrt{d}$ where d is the dimension of the Q/K vectors. The scaled attention scores are passed through a softmax function to convert them into attention weights. In some embodiments, the weights are represented using Int8 precision to reduce memory and computation costs. The attention weights are utilized to compute a weighted sum of the value vectors. The result of this weighted sum is a new context aware vector, one per token, that summarizes what it learned from the rest of the sequence. This vector is passed on to the next part of the transformer layer.

After attention, the context aware vector for each token is added to the original input vector to generate a residual vector. The residual vector is normalized. In some embodiments, the input vector is normalized. The normalized vector is provided to a feedforward network that processes each token independently. The output vector of the feedforward network is added back to the input vector and normalized. The output vector is subsequently provided to the next transformer layer of the LLM.

Normally, a transformer computes its own key and value vectors from the input at each layer so a new query vector, key vector, and value vector are determined in each layer. The systems and methods disclosed herein implement cross layer KV-sharing, an optimization in which the key and value vectors computed in one transformer layer are reused across multiple subsequent layers, rather than recalculated at each layer. With KV-sharing, the key and value vectors are computed once and shared across the attention layers. This technique can reduce KV cache size by a factor of 2-3×, resulting in improved memory efficiency during inference.

The above process is repeated for each transformer layer of the LLM.

Some layers of the transformer model use global attention, while others use local attention. For global attention layers, the key/value (KV) cache of multiple global layers may be tied across blocks, since the global attention layers dominate the KV cache size under long context scenarios.

Global attention allows a token to attend to all other tokens in the sequence. It enables global reasoning by allowing certain tokens to access the entire sequence, which is useful for summarization, classification, or retrieving document-wide context. The key and value vectors for globally attending tokens must be stored and reused across layers and time steps, which can increase cache pressure. If too many tokens have global access, the KV cache can grow significantly, slowing down inference and increasing memory usage. Additionally, excessive global tokens may cause attention heads to become noisy or redundant. Some heads may stop learning meaningful patterns, while others begin to perform the same function.

Local attention restricts each token to attend only to a sliding window of nearby tokens (e.g., 256 tokens wide), rather than the entire sequence. This reduces computational complexity from $O(n^2)$ to $O(nw)$ where n is the sequence length and w is the window size However, without any global attention, the model may struggle to summarize, classify, or understand relationships that span multiple sentences or paragraphs.

Hybrid attention is a transformer attention mechanism that combines local attention and global attention. By using local attention for most layers, hybrid attention reduces memory usage and computation time. It retains the scalability of local attention, making it possible to process tens or hundreds of thousands of tokens. While local attention is efficient, it cannot capture long-distance relationships. Global attention fills this gap by letting certain tokens attend to the whole sequence. Hybrid attention provides a balance between efficiency and expressive power. In some embodiments, one out of every six layers uses global attention while the remaining five layers uses local attention. Other ratios of global-to-local layer ratios may be implemented.

At the final layer, the LLM predicts the most likely next token by calculating probabilities for every possible continuation, selecting one based on these scores. This token is then added to the sequence, and the process repeats-feeding the new sequence back into the model, until a complete response is generated.

FIG. 1 is a block diagram illustrating a system to perform LLM inference in accordance with some embodiments. In the example shown, system 100 includes a client device 102 and a compute device 104. Client device 102 may be a computer, a laptop, a desktop, a server, a smart device, a tablet, etc. Compute device 104 may include one or more graphics processing units, one or more central processing units, one or more tensor processing units, one or more neural processing units, etc.

Client device 102 is configured to provide an input sequence to compute device 104. The input sequence may be a question, a prompt, a command, etc.

Compute device 104 is configured to perform LLM inference in response to receiving the input sequence by processing the sequence through a series of transformer layers to generate one or more output tokens. Processing the sequence through the series of transformer layers includes performing hybrid attention, multi-query attention, and cross layer KV sharing.

Compute device 104 is configured to provide the one or more output tokens to client device 102. In some embodiments, the one or more output tokens are provided to client device 102 as they are generated by compute device 104. In some embodiments, all of the output tokens are provided to client device 102 after they are generated by compute device 104.

Figure 2:
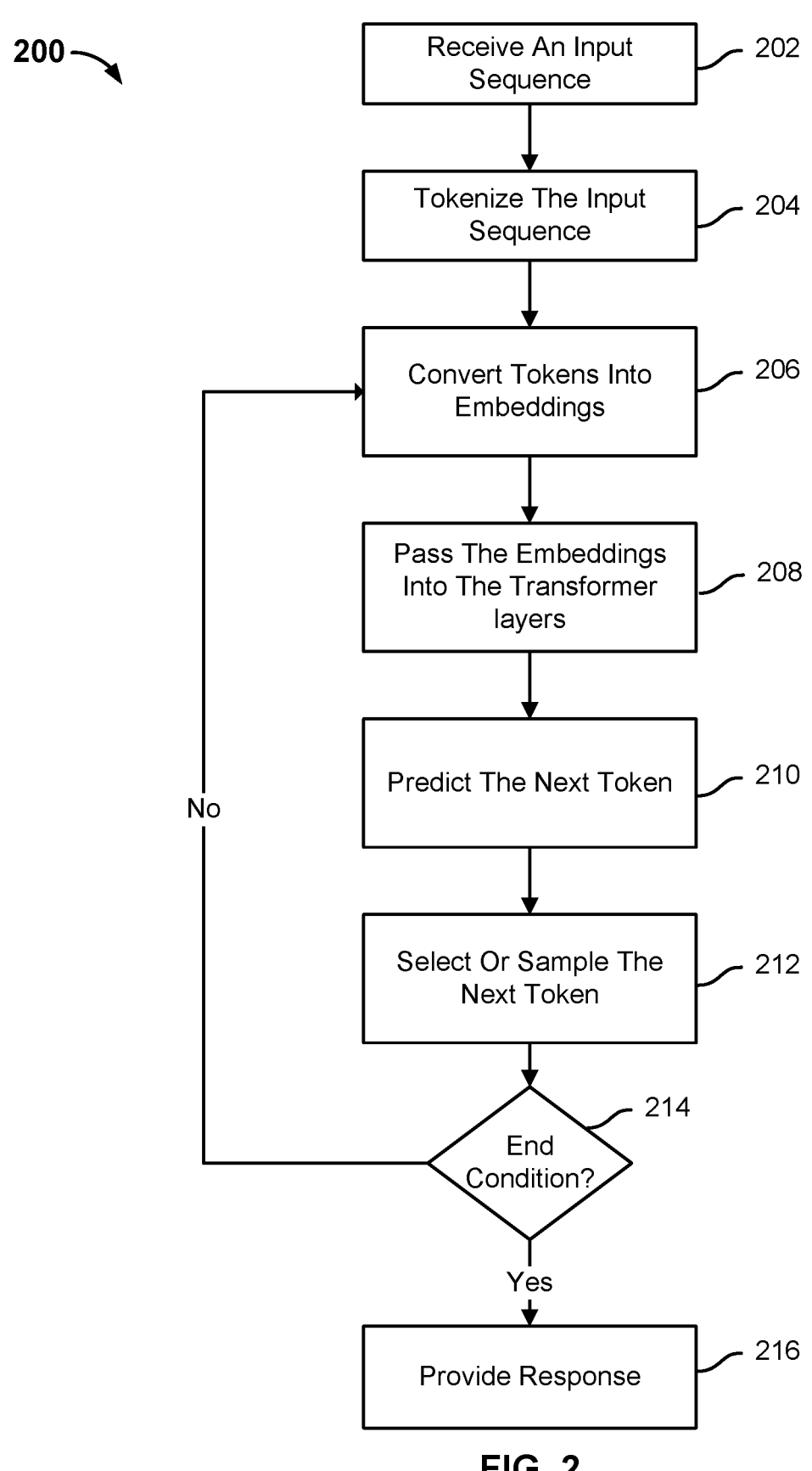
FIG. 2 is a flow diagram illustrating a process to perform LLM inference in accordance with some embodiments.

FIG. 2 is a flow diagram illustrating a process to perform LLM inference in accordance with some embodiments. Process 200 may be implemented by a compute device, such as compute device 104.

At 202, an input sequence is received. The input sequence may be a question, a prompt, a command, etc.

At 204, the input sequence is tokenized. The input sequence is comprised of text that is split into tokens (e.g., sub words or characters). These tokens are converted to token identifiers (integers).

At 206, the tokens are converted into embeddings. The LLM has an embedding matrix where each token identifier indexes into the embedding matrix. An embedding for a token is obtained based on the token identifier. A positional embedding may be added to a token's embedding to tell the LLM where the token is in the sequence.

At 208, the embeddings are passed into the transformer layers associated with the LLM. An LLM includes a plurality of transformer layers (e.g., 12, 24, 32, 40, 80, 96, 118, or any other number of layers).

The embeddings are passed into a first transformer layer and utilized to compute a corresponding query vector for each token, a corresponding key vector for each token, and a corresponding value vector for each token, through learned linear projections. Multi-query attention is performed. Multi-query attention consists of multiple attention layers (heads) in parallel with different linear transformations on the queries, keys, values and outputs. Multi-query attention is similar to multi-head attention, except that all heads share the key vectors and the value vectors associated with the tokens.

For each token's query vector, the LLM computes a dot product between the query vector and the key vector of every other token (including itself) to obtain raw attention scores—numbers that reflect how much the current token should "pay attention" to the others. The attention scores are scaled by $\sqrt{d}$ where d is the dimension of the Q/K vectors.

The scaled attention scores are passed through a softmax function to convert them into attention weights. In some embodiments, the weights are represented using Int8 precision to reduce memory and computation costs. The attention weights are utilized to compute a weighted sum of the value vectors. The result of this weighted sum is a new context aware vector, one per token, that summarizes what it learned from the rest of the sequence. This vector is passed on to the next part of the transformer layer.

After attention, the context aware vector for each token is added to the original input vector to generate a residual vector. The residual vector is normalized using layer normalization. In some embodiments, the input vector is normalized using layer normalization. The normalized vector is provided to a feedforward network that processes each token independently. The output vector of the feedforward network is added back to the input vector and normalized again. The output vector is subsequently provided to the next transformer layer of the LLM.

Normally, a transformer computes its own key and value vectors from the input at each layer so a new query vector, key vector, and value vector are determined in each layer. Cross layer KV-sharing is implemented, an optimization in which the key and value vectors computed in one transformer layer are reused across multiple subsequent layers, rather than recalculated at each layer. With KV-sharing, the key and value vectors are computed once and shared across the attention layers. This technique can reduce KV cache size by a factor of 2-3×, resulting in improved memory efficiency during inference. This enables longer context windows and reduces computation, since each layer is reusing the same KV.

Local attention is the default across layers, however, global attention is injected at regular intervals (e.g., every $6^{th}$ layer) to allow certain tokens to attend to the full sequence. Hybrid attention in LLM inference provides long-context reasoning without the cost of full attention everywhere, making LLM inference faster, scalable, and powerful.

At 210, the next token is predicted based on the final token's output vector from the transformer. The last token's output vector is passed through a linear layer that maps it to a set of logits-raw, unnormalized scores representing the model's confidence for each token in the vocabulary. The logits are converted to a probability distribution (e.g., by applying a softmax function).

At 212, the next token is selected or sampled. In some embodiments, the token with the highest probability is selected. In some embodiments, the token is selected based on a probability distribution. In some embodiments, beam search method is performed to select a token that is part of the best overall sequence.

The selected token is appended to the input sequence. As the sequence grows in size, each newly selected token is added to the sequence, forming the model's response token by token.

At 214, it is determined whether an end condition has been satisfied. An end condition is a rule or signal that informs the LLM to stop generating tokens during inference. In some embodiments, the end condition is an end-of-sequence token. In some embodiments, the end condition is a maximum token limit. In some embodiments, a predefined string or token sequence has been produced. In some embodiments, the end condition is a user interrupt.

In response to determining that the end condition has not been satisfied, process 200 returns to 206. In response to determining that the end condition has been satisfied, process 200 proceeds to 216.

At 216, the response is provided. In some embodiments, a complete response is provided after the end condition has been satisfied. In some embodiments, a partial response is provided after the next token is selected and a complete response is provided after the end condition has been satisfied.

Figures 3A, 3B:
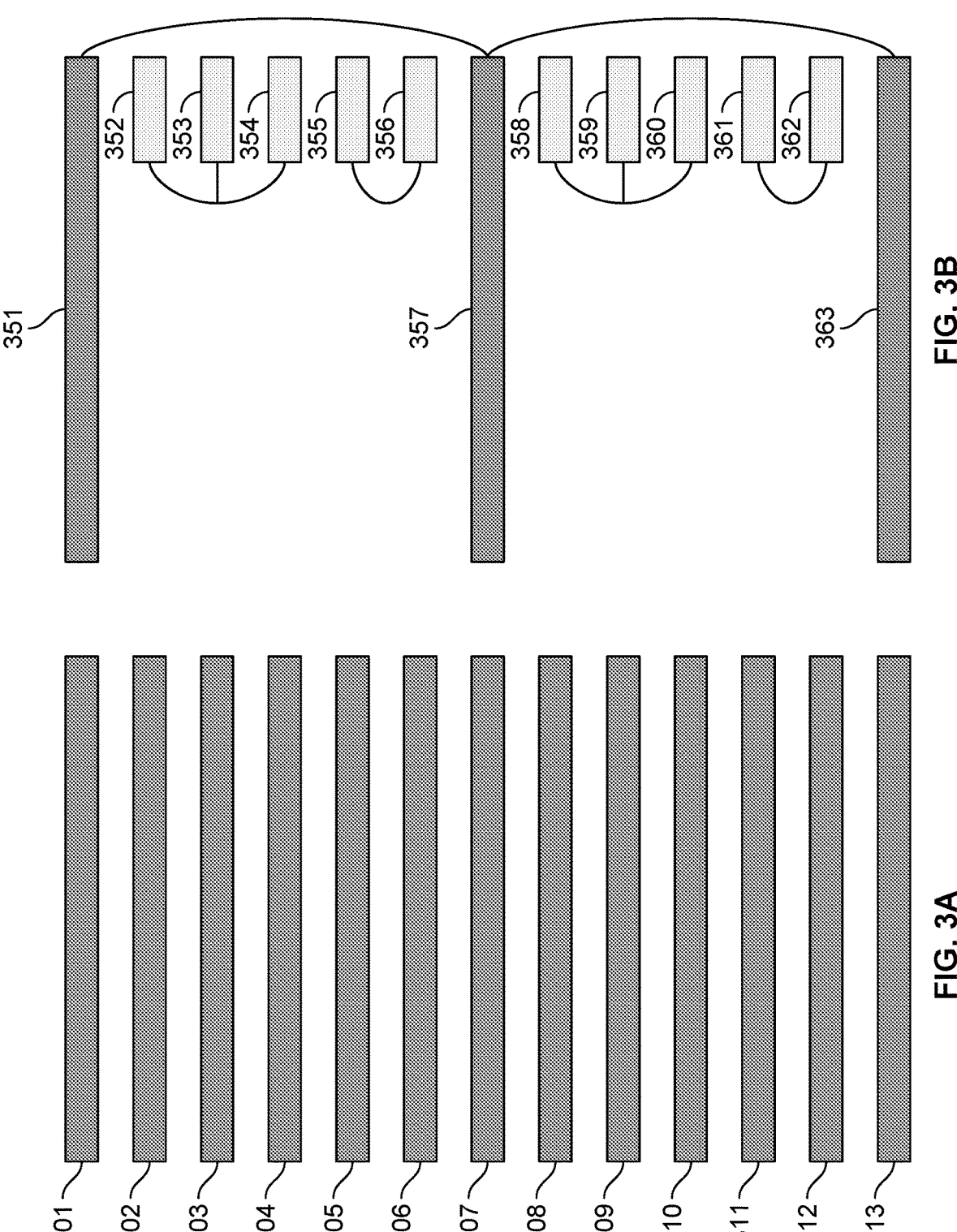
FIG. 3A is an example of a standard transformer design.
FIG. 3B is a transformer design in accordance with some embodiments.

FIG. 3A is an example of a standard transformer design. In the example shown, global attention is performed across layers 301, 302, 303, 304, 305, 306, 307, 308, 309, 310, 311, 312, 313.

FIG. 3B is a transformer design in accordance with some embodiments. In the example shown, the transformer includes layers 351, 352, 353, 354, 355, 356, 357, 358, 359, 360, 361, 362, and 363. Global attention is performed across layers 351, 357, 363. Local attention is performed across layers 352, 353, 354, 355, 356, 358, 359, 369, 361, 362. KV sharing occurs between non-adjacent global layers 351, 357, 363. KV sharing occurs between layers 352, 353, 354, between layer 355 and layer 356, between layers, 358, 359, 360, and between layer 361 and 362.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving an input sequence from a client device;

performing large language model inference by processing the input sequence including by tokenizing the input sequence to create a plurality of tokens, converting the plurality of tokens into embeddings, and passing the embeddings through a series of transformer layers to generate one or more tokens including by performing hybrid attention, multi-query attention, and cross-layer key value sharing, wherein performing hybrid attention includes:

enabling local attention for a plurality of consecutive layers of the series of transformer layers; and injecting global attention at regular intervals in between a first plurality of local attention enabled layers of the series of transformer layers and a second plurality of local attention enabled layers of the series of transformer layers;

wherein performing the multi-query attention at each transformer layer of the series of transformer layers includes determining, for each token, corresponding key and value vectors among a plurality of attention heads within the same transformer layer, wherein performing cross-layer key value sharing includes reusing at least a portion of key vectors and value vectors generated by a preceding transformer layer for attention computations in one or more subsequent transformer layers so as to reduce a key-value cache size and memory bandwidth needed for inference, wherein the cross-layer key value sharing occurs between adjacent layers in which the local attention is performed and between non-adjacent layers in which the global attention is performed; and providing the one or more generated tokens to the client device.

2. The method of claim 1, wherein the input sequence includes a question, a prompt, or a command.

3. The method of claim 1, further comprising adding corresponding positional embeddings to the embeddings associated with the plurality of tokens.

4. The method of claim 1, wherein the first plurality of local attention enabled layers and the second plurality of local attention enabled layers include five layers.

5. The method of claim 1, wherein the corresponding key vectors for each token associated with the input sequence and the corresponding value vectors for each token associated with the input sequence are shared across two or more transformer layers of the transformer layers.

6. The method of claim 1, wherein weights used to perform the multi-query attention are represented using Int8 precision.

7. The method of claim 1, wherein the one or more tokens are predicted based on an output vector associated with a last token in the input sequence.

8. The method of claim 7, wherein the one or more predicted tokens are selected based on a highest probability, a probability distribution, or a beam search method.

9. The method of claim 8, wherein the one or more selected tokens are appended to the input sequence.

10. The method of claim 9, wherein the one or more selected tokens are appended to the input sequence until an end condition has been satisfied.

11. The method of claim 10, wherein the end condition is a rule, an end-of-sequence token, a maximum token limit, or a user interrupt.

12. The method of claim 1, wherein the one or more generated tokens are provided to the client device as the one or more generated tokens are being selected.

13. The method of claim 1, wherein the one or more generated tokens are provided to the client device after end condition has been satisfied.

14. A system, comprising:
a compute device configured to:
  receive an input sequence from a client device;
  perform large language model inference by processing the input sequence including by tokenizing the input sequence to create a plurality of tokens, converting the plurality of tokens into embeddings, and passing the embeddings through a series of transformer layers to generate one or more tokens including by performing hybrid attention, multi-query attention, and cross-layer key value sharing,
  wherein to perform hybrid attention, the compute device is configured to:
    enable local attention for a plurality of consecutive layers; and
    inject global attention at regular intervals in between a first plurality of local attention enabled layers and a second plurality of local attention enabled layers;
  wherein to perform the multi-query attention at each transformer layer of the series of transformer layers, the compute device is configured to
    determine, for each token, corresponding key and value vectors among a plurality of attention heads within the same transformer layer, wherein performing cross-layer key value sharing includes reusing at least a portion of key vectors and value vectors generated by a preceding transformer layer for attention computations in one or more subsequent transformer layers so as to reduce a key-value cache size and memory bandwidth needed for inference, wherein the cross-layer key value sharing occurs between adjacent layers in which the local attention is performed and between non-adjacent layers in which the global attention is performed; and
  provide the one or more generated tokens to the client device; and
a memory coupled to the compute device and configured to provide the compute device with instructions.

15. The system of claim 14, wherein the input sequence includes a question, a prompt, or a command.

16. The system of claim 14, wherein the corresponding key vectors for each token associated with the input sequence and the corresponding value vectors for each token associated with the input sequence are shared across two or more transformer layers of the transformer layers.

17. The system of claim 14, wherein weights used to perform the multi-query attention are represented using Int8 precision.

18. The system of claim 14, wherein the one or more tokens are predicted based on an output vector associated with a last token in the input sequence.

19. The system of claim 14, wherein the one or more selected tokens are appended to the input sequence.

20. A computer program product embodied in a non-transitory computer readable medium and comprising computer instructions for:
receiving an input sequence from a client device;
performing large language model inference by processing the input sequence including by tokenizing the input sequence to create a plurality of tokens, converting the plurality of tokens into embeddings, and passing the embeddings through a series of transformer layers to generate one or more tokens including by performing hybrid attention, multi-query attention, and cross-layer key value sharing,
wherein performing hybrid attention includes:
  enabling local attention for a plurality of consecutive layers; and
  injecting global attention at regular intervals in between a first plurality of local attention enabled layers and a second plurality of local attention enabled layers;
wherein performing the multi-query attention at each transformer layer of the series of transformer layers includes determining, for each token, corresponding key and value vectors among a plurality of attention heads within the same transformer layer, wherein performing cross-layer key value sharing includes reusing at least a portion of key vectors and value vectors generated by a preceding transformer layer for attention computations in one or more subsequent transformer layers so as to reduce a key-value cache size and memory bandwidth needed for inference, wherein the cross-layer key value sharing occurs between adjacent layers in which the local attention is performed and between non-adjacent layers in which the global attention is performed; and
providing the one or more generated tokens to the client device.

\* \* \* \* \*